United States Patent
Trahan et al.

(10) Patent No.: US 11,072,739 B2
(45) Date of Patent: Jul. 27, 2021

(54) COMPOSITION AND METHOD FOR IMPROVING PERFORMANCE OF FRICTION REDUCING POLYMERS IN HIGH DISSOLVED SOLIDS WATER

(71) Applicant: David O. Trahan, Lafayette, LA (US)

(72) Inventors: David O. Trahan, Lafayette, LA (US); Jia Li, Lafayette, LA (US)

(73) Assignee: Downhole Chemical Solutions, LLC, Frisco, TX (US)

(*) Notice: Subject to any disclaimer, the term of this patent is extended or adjusted under 35 U.S.C. 154(b) by 0 days.

(21) Appl. No.: 16/963,115

(22) PCT Filed: Jan. 22, 2019

(86) PCT No.: PCT/US2019/014567
§ 371 (c)(1),
(2) Date: Jul. 17, 2020

(87) PCT Pub. No.: WO2019/144127
PCT Pub. Date: Jul. 25, 2019

(65) Prior Publication Data
US 2020/0399531 A1     Dec. 24, 2020

Related U.S. Application Data

(60) Provisional application No. 62/619,591, filed on Jan. 19, 2018.

(51) Int. Cl.
| | |
|---|---|
| *C09K 8/88* | (2006.01) |
| *C09K 8/60* | (2006.01) |
| *C09K 8/66* | (2006.01) |
| *C09K 8/68* | (2006.01) |
| *C09K 8/84* | (2006.01) |

(52) U.S. Cl.
CPC ............. *C09K 8/882* (2013.01); *C09K 8/602* (2013.01); *C09K 8/665* (2013.01); *C09K 8/68* (2013.01); *C09K 8/845* (2013.01); *C09K 2208/28* (2013.01)

(58) Field of Classification Search
CPC ........ C09K 8/882; C09K 8/602; C09K 8/665; C09K 8/68; C09K 8/845; C09K 2208/28
See application file for complete search history.

(56) References Cited

U.S. PATENT DOCUMENTS

| | | | |
|---|---|---|---|
| 4,615,825 A | 10/1986 | Teot et al. | |
| 5,076,361 A * | 12/1991 | Naae | C09K 8/90 166/294 |
| 8,727,004 B2 * | 5/2014 | Bull | E21B 43/267 166/308.4 |
| 9,676,995 B2 | 6/2017 | Sun et al. | |
| 2011/0177985 A1 | 7/2011 | Saini et al. | |
| 2015/0300139 A1 | 10/2015 | Armstrong et al. | |
| 2017/0044586 A1 | 2/2017 | Duran | |
| 2017/0096597 A1 * | 4/2017 | Hu | C09K 8/82 |

* cited by examiner

*Primary Examiner* — Kumar R Bhushan
(74) *Attorney, Agent, or Firm* — Matthews, Lawson, McCutcheon & Joseph, PLLC

(57) ABSTRACT

Systems and methods include using a fracture fluid downhole for fracturing a formation. The method includes providing an aqueous solution comprising dissolved solids at a certain ionic strength, and adding a proppant to create a fracture fluid. The method continues by adding a polymeric additive and a surfactant to the fracture fluid, wherein the polymeric additive comprises friction reducing capabilities that can be decreased by the ionic strength present in the fracture fluid (i.e., ionic strength originally found in the water). The addition of the polymeric additive and the surfactant to the fracture fluid creates an enhanced fracture fluid, wherein the surfactant increases the performance of the friction reducing capabilities of the polymeric additive in the enhanced fracture fluid, which provides a more efficient fracturing operation. The method concludes by pumping the enhanced fracture fluid downhole for a more efficient fracture of the formation.

12 Claims, 3 Drawing Sheets

COMPOSITION AND METHOD FOR IMPROVING PERFORMANCE OF FRICTION REDUCING POLYMERS IN HIGH DISSOLVED SOLIDS WATER

REFERENCE TO RELATED APPLICATIONS

The present application is a U.S. national stage application claiming priority to Patent Cooperation Treaty (PCT) Application No. PCT/US19/14567 filed Jan. 22, 2019, that in turn claims priority to U.S. Provisional Patent Application No. 62/619,591, filed 19 Jan. 2018 and entitled "Composition and Method for Improving Performance of Friction Reducing Polymers in High Dissolved Solids Water." The contents of both above-referenced applications are incorporated in their entirety herein, by reference.

FIELD

Embodiments usable within the scope of the present disclosure relate, generally, to compositions and methods for treating water used in well fracture operations. These compositions and methods are used to improve the performance of water-soluble polyacrylamide-based friction reducers present in the water and used for well fracture operations. Embodiments may include a blend of water-soluble surface-active chemicals (e.g., surfactants), which when added into the water that is used in well fracture operations, greatly enhance the capability of the polyacrylamide-based friction reducer to function more effectively in the high-total dissolved-solids water, such as oil and gas produced water.

BACKGROUND

Hydraulic fracturing of oil and gas shale reservoirs is a process where a fluid (e.g., water) is mixed with chemicals and sand (about 99% water and sand), and pumped at high pressures downhole through a wellbore to create open fissures in oil and gas bearing shale rock formations. The injection rate for the fluid exceeds the formation's ability to accept without fracturing. When the formation fractures, the fluid flows into fissures formed hydraulically by the flow and pressure of the water. The typical fracture water blend contains propping agents (e.g., sand, ceramic, microspheres, etc.) with uniform size, high degree of sphericity, high compressive strength, and consistent density and stability at reservoir temperature. A porous proppant can be used to keep the newly created fractures open so that production fluid may flow out of the fractures and out through the wellbore.

The fracture fluid is designed primarily to suspend and transport as much of the intended volume of proppant as possible via a commonly tortuous path into the induced fracture. These applications require substantial volumes of water, typically over twenty million liters per well. When pumping a large volume of water in a short time interval, the hydraulic friction of water can result in unacceptably high pump in pressures and reduce the pump flowing volume. Chemicals may be added to the water to reduce the friction and pressure as the fluid is pumped down the wellbore. The efficacy of many of the chemicals used to reduce the friction depends on the presence or absence of other dissolved solids in the water. For example, most friction reducing chemicals are designed to work with fresh water having a low concentration of solids or a low salinity level. Finding fresh water can involve trucking or otherwise transporting huge quantities of water to the fracturing site. In many instances, this may involve the construction of large reservoirs just to hold the water that will be pumped down the wellbore.

At the same time, the wellbore that is to be fractured may traverse an underground water reserve that contains a large volume of water. The water from the wellbore, however, is often unusable for fracturing due to the high salinity. As such, the unusable water must be transported and injected elsewhere back into the ground. Therefore, a need exists for a friction-reducing chemical that can allow the produced water (i.e., high-salinity water) to be used for fracture fluid without causing unacceptably high pressures while the fracture fluid flows into the wellbore.

SUMMARY

Embodiments of the present invention include systems and methods for forming a fracture fluid using the produced water for conducting fracturing operations downhole.

The disclosed embodiments may include a method of using a fracture fluid downhole for fracturing a formation. The method may include storing water in a pump tank. The stored water may include dissolved solids at an ionic strength. As used herein, "ionic strength" is a measure of electrolyte concentration. The method may also include adding a proppant to the stored water to create a fracture fluid. Next, a polymeric additive and a surfactant can be added to the fracture fluid, wherein the polymeric additive comprises friction reducing capabilities that can be decreased by the ionic strength present in the fracture fluid (i.e., ionic strength originally found in the stored water). The addition of the polymeric additive and the surfactant to the fracture fluid creates an enhanced fracture fluid, wherein the surfactant increases friction reducing capabilities of the enhanced fracture fluid for more efficient fracturing operations. The method concludes by pumping the enhanced fracture fluid downhole for fracture of the formation.

The disclosed embodiments may include a method using a water-soluble polymeric additive that includes an anionic polyacrylamide. Furthermore, the disclosed embodiments may use a surfactant having at least one of: a carboxylate, a sulfonate, a sulfate, or combinations thereof.

The disclosed embodiments may also include a method of fracturing a formation that includes pumping produced water out from a wellbore. The produced water may include an ionic strength that is significantly (e.g., a thousand times) greater than fresh water. The method includes adding a proppant to the produced water to create a fracture fluid. The proppant can be various sizes and shapes of, for example, sand, ceramics, microspheres, beads, and/or other materials with uniform size, high degree of sphericity, high compressive strength, and consistent density and stability. The method steps can continue by adding a polymeric additive and a surfactant to the fracture fluid to form an enhanced fracture fluid. The addition of the polymeric additive can include friction reducing capabilities for use in a fracture fluid with an ionic strength that is less than the ionic strength of the produced water. The addition of the surfactant to the enhanced fracture fluid increases the friction reducing capabilities of the enhanced fracture fluid for improving the efficiency of the fracture operation. The steps of the method can conclude by pumping the fracture fluid into the formation for fracturing the formation.

In certain embodiments of the method, the wellbore providing the produced water is located adjacent to the formation being fractured. In further embodiments of the method, the wellbore providing the produced water is located within a distance of 100 m of the formation being fractured.

DETAILED DESCRIPTION OF EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
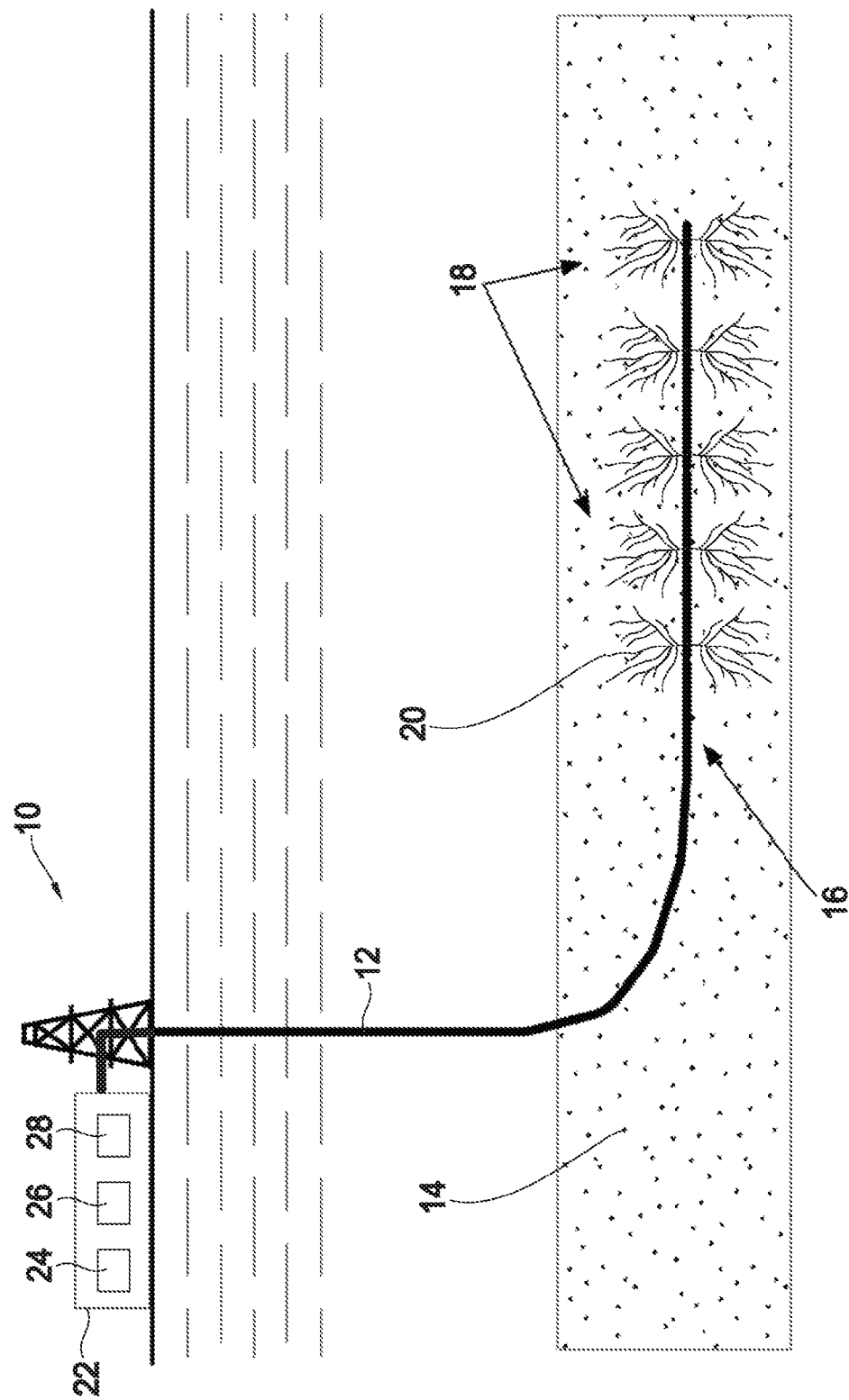
FIG. 1 illustrates a schematic side view of a possible operating environment for downhole fracturing of a formation using the methods and systems of the present invention for conducting said downhole fracturing of the formation.

FIG. 1 illustrates a schematic side view of a possible operating environment 10 for downhole fracturing through a wellbore 12 of a formation 14. The formation 14 can be an oil or gas producing formation such as shale strata. As mentioned above, the formation 14 may include hydrocarbons that are not readily drawn out of the formation 14. Creating small fissures 18, however, can beneficially cause the formation 14 to release production fluid 16 (e.g., hydrocarbons, crude oil, shale oil, natural gas, etc.) from the formation 14 for flowing into the wellbore 12. The wellbore 12 conveys the production fluid 16 to the surface where it can be stored, transported, treated, or otherwise refined.

The fissures 18 (i.e., fractures 18) may be caused by hydraulic fracturing wherein a fluid (e.g., water, produced water) is mixed with chemicals and sand to become fracture fluid 20. The fracture fluid 20 can contain proppants 24 (e.g., sand, ceramic, microspheres, etc.) which can have uniform size, a high degree of sphericity, a high compressive strength, and a consistent density and stability at temperatures within the formation 14. The proppant 24 can be porous, which keeps the newly created fissures 18 open so that production fluid 16 may flow out of the fissures 18 and then out through the wellbore 12. The fracture fluid 20 may be pumped into the wellbore 12 with a pump 22, or some other pressurizing mechanism.

The fracture fluid 20 is designed primarily to suspend and transport as much of the intended volume of proppant 24 as possible via a commonly tortuous path into the induced fracture (e.g., fissures 18). The large volume of water that will be used for the fracture fluid 20 may be trucked, piped, or otherwise transported to a temporary storage tank or pond. The proppant 24 (and other additions to the fracture fluid 20 as described below) can be added to the fracture fluid 20 while it is stored in the temporary storage tank or pond, or in certain embodiments, can be added at the time that the fracture fluid 20 is pumped down the wellbore 12. For example, the water may be combined with the proppant 24 in a mixer bowl that continuously receives water, proppant 24, and other components (as described in detail below). A chem-add trailer can be used to add the proppant 24 and other components to the mixer bowl. The mixer bowl can include a downspout that continuously feeds the fracture fluid 20 down the wellbore 12. The pumps 22 may pump and mix the fracture fluid 20 at eighty to one hundred barrels a minute.

In order to transmit pressures and carry the proppant 24, the fracturing fluid 20 can be viscosified. When the fracturing operation is finished, the fracture fluid 20 should lose viscosity to allow the proppant 24 to settle in place; and then, this low viscosity fluid should efficiently flow back to the wellbore 12 and up to the surface, leaving behind the proppant 24 grains. These applications for fracturing operations require substantial volumes of water, typically over twenty-two million liters (six million gallons) per well. When pumping a large volume of water in a short time interval, the hydraulic friction of water can result in unacceptably high pump-in pressures and can reduce the pump flowing volume.

Embodiments of the present invention include, treating water with anionic polyacrylamides and a surfactant or surfactant blend for use in well fracturing operations, wherein the treated water with the anionic polyacrylamides and the surfactant is referred to as a "slickwater." Traditionally, surfactants have been added to water for purposes of aiding in polymer hydration and/or improving oil and gas flow from within subterranean reservoir into wellbore, but have not been used to aid in improving a polymer's electrolyte stability as used in slickwater for fracturing operations. The fracturing fluid 20 can be composed of primarily water and proppant 24. Additional chemicals 26 can be added to reduce friction, scale, bacterial growth, corrosion, and to provide other benefits during the stimulation process. Low viscosity slickwater fluids generate fractures of lesser width and, therefore, greater fracture length, theoretically increasing the complexity of the fracture network for better formation 14-to-wellbore 12 connectivity. For example, the fracturing fluid 20 may also be injected using polymers, such as polysaccharides: guar, hydroxypropyl guar (HPG) and hydroxyethylcellulose (HEC), which is often cross-linked by borate, transition metal (zirconium, titanium) complexes, or medium to high molecular weight polyacrylamide (PAM). The benefits of slickwater fracturing can include reduced gel damage, cost containment, higher stimulated reservoir volume, and better fracture containment.

In well fracture and well stimulation operations, fluid friction is commonly defined as the resistance of the fluid to flow in production string or casing. This can be related to water flowing in pipes as the outer surface of the water impacts the inner surface of the pipe. This friction causes the pressure in the pipe to increase. As the pressure in the pipe increases, the velocity of the water along the inner surface of the pipe decreases, but the water in the center of the pipe will have a higher velocity.

There are two general regimes of flow of water in pipes, which include laminar and turbulent. Laminar flow is described as a layer of fluid remaining distinct from another layer over the entire length of flow. In other words, one fluid layer smoothly slides past the next layer above or below it, in parallel. Turbulent flow generates eddy currents of fluid flow. In turbulent flow, fluid moves in the form of cross-currents and eddies.

Water pumped as a fracturing fluid 20 encounters both flow regimes (i.e., laminar, turbulent) during a fracturing treatment. As the velocity of the fluid movement increases, the flow passes through the transition regime from laminar to turbulent. Turbulent flow generally occurs in the boundary layer near solid surfaces, in this case, the internal surface of the well tubing or casing, and the associated friction increases, as the flow velocity increases. After the fracture fluid 20 exits the mixer bowl and flows down the wellbore 12, the fracture fluid 20 almost immediately encounters turbulent flow and turbulent friction. The energy losses due to turbulent friction can be substantial and can interfere with pressure transfer from the pump 22 to the formation 14.

Drag reduction or friction reduction is a phenomenon in which the friction of a liquid, flowing in a pipe in turbulent flow, can be decreased by using a small amount of an additive 26. A small amount of a polymeric additive 26, called Drag Reducers or Friction Reducers, can be added into well fracture water to reduce the turbulent friction through pipes. A primary purpose of a polymeric friction-reducer additive 26 is to delay the onset of turbulent flow. The addition of this additive 26 can shift the transition from laminar flow to turbulent flow, to a higher flow velocity. Thus, there is a reduced amount of energy required to transport the water down to the formation 14 being fractured.

Adding a small concentration of linear macromolecules, within the additive 26, to a flowing fluid can reduce wall shear stress, which can correspond to an increase in the pumpability of the flowing fluid. One example of molecules that have been proven useful for drag reduction is anionic polyacrylamides. The performance of anionic polyacrylamides depends on the salinity concentration and temperature of the fluid, along with other factors, including polymer type and concentration, molecular weight and distribution, solvent chemistry, pH, ionic strength, molecular conformation, flow geometry, and degree of mechanical shearing. The presence or absence of these characteristics can require careful selection of the water source that is mixed to produce the fracture fluid 20. For example, selecting a water source that has too high of a salinity concentration can increase drag to the point at which it is economically unusable, and in some instances may prevent certain pumps 22 from even being able to provide enough pressure to fracture the formation 14.

This selection process can often eliminate otherwise convenient water sources from being used. For example, water can be a plentiful fluid drawn from the wellbore 12 before it is ready to be fractured. That is, the formation 14 may be located below one or several water aquifers that are emptied during the drilling process. The produced water from the wellbore 12, however, often has an ionic strength that is significantly (e.g., a thousand times) stronger than fresh water that is typically used as fracture fluid 20. The produced water must be removed from the wellbore 12 and stored elsewhere. This removal multiplies the effort because fresh water must be transported in to the wellbore 12.

To overcome this problem, certain embodiments of the invention include adding a surfactant 28 with a certain composition, as well as using the methods of the present invention, for treating fracture fluid 20 to improve the performance of water-soluble polyacrylamide-based friction reducer additives 26, which are used in well fracture operations. The surfactant 28 can include a blend of water-soluble surface-active chemicals that, when added into water used in well fracture operations, greatly enhance the capability of a polyacrylamide-based friction reducer additive 26 to function effectively in high-total dissolved-solids water, such as oil and gas produced water.

As discussed herein, an "anionic surfactant" is a surfactant molecule that can dissociate to yield a surfactant ion whose polar group is negatively charged (example: Sodium dodecyl sulfate, $(CH_3(CH_2)_{11}SO_4^-Na^+)$. A "nonionic surfactant" is a surfactant molecule whose polar group is not electrically charged (example: poly(oxyethylene) alcohol). Other surfactants can include: a "co-surfactant," which is a surfactant that may be added to a system to enhance the effectiveness of another surfactant, a "zwitteronic surfactant," which is a surfactant molecule that contains both negatively and positively charged groups (example: lauramidopropylbetaine), and "fatty alcohol surfactants," which is a class of primary alcohol surfactants having hydrocarbon chains of between 6 and 20 carbon atoms.

Still other surfactants may include an "amphoteric surfactant," which is a surfactant molecule for which the ionic character of the polar group depends on solution pH. For example, lauramidopropyl betaine is positively charged at low pH but is electrically neutral, having both positive and negative charges at intermediate pH.

Anionic surfactants 28, alone and/or in combination, improve friction reducing capability of anionic polyacrylamide polymers in high electrolyte content water well fracture fluid 20. Several types of anionic surfactants 28 include carboxylates, sulfonates, and sulfates. Along with polymeric additives 26, surfactants 28 can be used as efficient drag reduction or friction reducers. The ability of surfactant micelles to reduce friction is tied to the surfactant's ability to return to its original form after its structure has been altered as a result of high shear. Polymeric additives 26, such as anionic polyacrylamides, can break into small segments which do not have the ability to revert to the original high molecular form.

As discussed herein, a "micelle" is an aggregate of surfactant molecules or ions in solution. An "aggregate" is a group of species, usually droplets, bubbles, particles or molecules that are held together in some way. Such aggregates form spontaneously at sufficient high surfactant concentration, above the critical micelle concentration. The micelles typically contain from tens to hundreds of molecules and are of colloidal dimensions. If more than one kind of surfactant forms the micelles, they are referred to as mixed micelles. If a micelle becomes larger than usual as a result of either the incorporation of solubilized molecules or the formation of a mixed micelle, then the term swollen micelle is applied. In "Critical Micelle Concentration(s) (CMC)" the surfactant concentration is above which micelles begin to form. In practice, a narrow range of surfactant concentrations represents the transition from a solution in which only single, unassociated surfactant molecules (monomers) are present to a solution containing micelles.

Drag reduction can be quantified by the following equation: % DR=($\Delta$Ps−$\Delta$Pp)×100×$\Delta$Ps. $\Delta$Ps is the pressure drop in a given length of the tube for a pure solvent, and $\Delta$Pp is the pressure drop for drag reduction solution with the same flow rate of liquid for both. The pressure loss in a pipe is due to fluid-frictional resistance, broadly classed in terms of laminar and turbulent flows by the fluid Reynolds number. Turbulent flow is defined here in the engineering sense of the flow exceeding a critical Reynolds number (Re), which is for pipes Re=VD/v>2300, where D is the pipe diameter, V is the flow velocity, v is the kinematic viscosity of the drag reducing solution.

There are a number of different concepts suggested to explain how polymer molecules work to reduce turbulence in water flowing pipes. For example, the polymer hydrodynamic coil can interact with and disrupt eddies and microvortices present in turbulent flows. The friction reduction seems to depend on the stretching of individual molecules by high strain rates in the flow. At high strain rates, the polymer chain tends to elongate along the principal strain rate axis, and large extensions result. At the same time, a form of strain-rate hardening can occur in which the elongation viscosity becomes very high. As the elongation viscosity increases, the large-scale bursts and sweeps located in the wall-layer flows are inhibited. Researchers emphasize that the drag reduced flow is still turbulent, and the additives 26 usually do not make it laminar again.

The friction reduction is characterized by large changes in the flow caused by the presence on low treatment levels of polymeric additives 26. The complexity of the friction reduction phenomenon leads to several theoretical models for describing friction reduction. Embodiments of the present invention relate to the use of anionic and nonionic surfactants 28, at given rates, to improve or "boost" the ability of anionic polyacrylamide friction-reducing polymers for working as a friction reducer in high-electrolyte content water that is used in well fracture operations.

The surfactants 28 used in the present invention are "surface-active" agents. A surface-active chemical is one which tends to accumulate at a surface or interface. An interface can be the area of contact between two substances. Where the interface is between two substances not in the same phase, the interface is usually called a surface. Surfactants 28 used in the present invention are amphiphilic molecules. They have two distinctly different characteristics, polar and non-polar, in different parts of the same molecule. Therefore, a surfactant molecule has both hydrophilic (water-loving) and hydrophobic (water-rejecting) characteristics. Specifically, as used herein, "hydrophilic" is a qualitative term referring to the water-preferring nature of a species (atom, molecule, droplet, particle, etc.), whereas "hydrophobic" is a qualitative term referring to the water-avoiding nature of a species (atom, molecule, droplet, particle, etc.).

Surfactants consist of a polar (hydrophilic) head and a non-polar (hydrophobic) tail. Depending upon the electrical charge of the head group, the surfactants 28 can be classified as anionic (hydrophilic head is negatively charged), cationic (hydrophilic head is positively charged) and nonionic (hydrophilic head is polar but not fully charged).

At very low concentrations in water, surfactant molecules are unassociated. At high concentration in water, surfactants can form micelles. The concentration at which micelles form is called the critical micelle concentration (CMC). The association of the molecules to micelles is reversible, i.e. when the concentration is below the critical value, the micelles will dissociate into molecules again. The friction reducing ability of a surfactant solution depends strongly on the shape of these micelles. The surface tension of water undergoes a precipitous decrease, and the detergency of the mixture increases dramatically at the CMC.

Anionic surfactants are the most widely used of the four classes. Important types of anionic surfactants are carboxylates (including sulfo carboxylates, as with dioctyl sulfosuccinate), sulfonates, sulfates and phosphates. Surfactants with less than 10 carbons can be too soluble in water to have good surface activity. Surfactants, with more than 20 carbons in a linear configuration, can be too insoluble in water to use in aqueous fluid. Sodium is the most common cation, with potassium and ammonium also used to lesser degree. Commonly used anionic surfactants include: Sodium dodecyl benzene sulfonate (SDBS) ($C_{12}H_{25}C_6H_4SO_3$—Na) molecular weight of 348; Sodium lauryl sulfate (SLS or SDS) ($C_{12}H_{26}O_4S$—Na) molecular weight 289; Sodium lauryl ether sulfate (SLES) ($CH_3(CH_2)_{10}CH_2(OCH_2CH_2)_3OSO_3$—Na molecular weight 372; Sodium stearate (SS) ($C_{17}H_{35}COO$—Na) molecular weight 306; Ammonium lauryl sulfate (ALS) ($CH_3(CH_2)_{10}CH_2OSO_3NH_4$) molecular weight 283.

Various fatty alcohols can be reacted with chlorosulfonic acid or sulfur trioxide to produce their sulfuric acid esters. The properties of these surfactants depend on the alcohol chain length as well as the polar group and are often mixtures or blends comprised of several alcohols of different lengths, as shown in the following example: $C_{12}H_{23}$—OH+ $ClSO_3H \rightarrow C_{12}H_{23}OSO_3H$ (lauryl alcohol+chlorosulfonic acid→lauryl sulfate).

The sulfate group is more hydrophilic than the sulfonates. However, the sulfates are less stable to hydrolysis than is the sulfonate group. The R—SO3 bond in sulfonate is more stable than the R—O—SO3 in sulfates against hydrolysis and exhibits high electrolyte stability.

Certain embodiments can combine surfactant compounds to improve a polyacrylamide polymer's ability to work as a friction reducer in well fracture waters with high electrolyte content. High electrolyte content means the water has a high concentration of soluble minerals or total dissolved solids ("TDS"). As hydraulic well fracture operations expand, there is a growing trend in the industry to choose to use high electrolyte content water produced by oil and gas wells in well fracture applications. Increased use of produced water in well fracture applications is creating challenges for operators to provide a source of anionic polyacrylamide polymers capable of working in high TDS water. Certain embodiments of the present invention provide surfactant blends capable of reducing and overcoming the inhibiting effect of the high TDS on anionic polyacrylamide friction reducing polymers additives 26. The negative effect is manifested in reduced friction reduction.

Surfactants 28 can reduce friction of fluids by transitioning large aggregates into rod-like micelles. The drag reducing effect is determined by many factors, such as the chemical structure of the surfactant 28, the concentration or amount of surfactant 28, the presence of counterions, and the ratio of counterions to surfactants 28. In systems containing large ionic species (colloidal ions, membrane surfaces, etc.), "counterions," as discussed herein, are those that, compared to the large ions, have low molecular mass and an opposite charge sign. For example, clay particles are usually negatively charged and are naturally associated with exchangeable counterions, such as sodium and calcium.

The number of surfactant monomers forming a micelle is a relevant parameter that contains indirect information on the micelle geometries. Most surfactant 28 drag-reducing products form rod-like micelles in the quiescent state and demonstrate distinctive rheological properties, such as a high zero-shear viscosity, shear thinning behavior with increasing shear rate, and shear-induced structure represented by a local increase in both shear viscosity and the first normal stress difference at a certain shear rate range.

Figure 2:
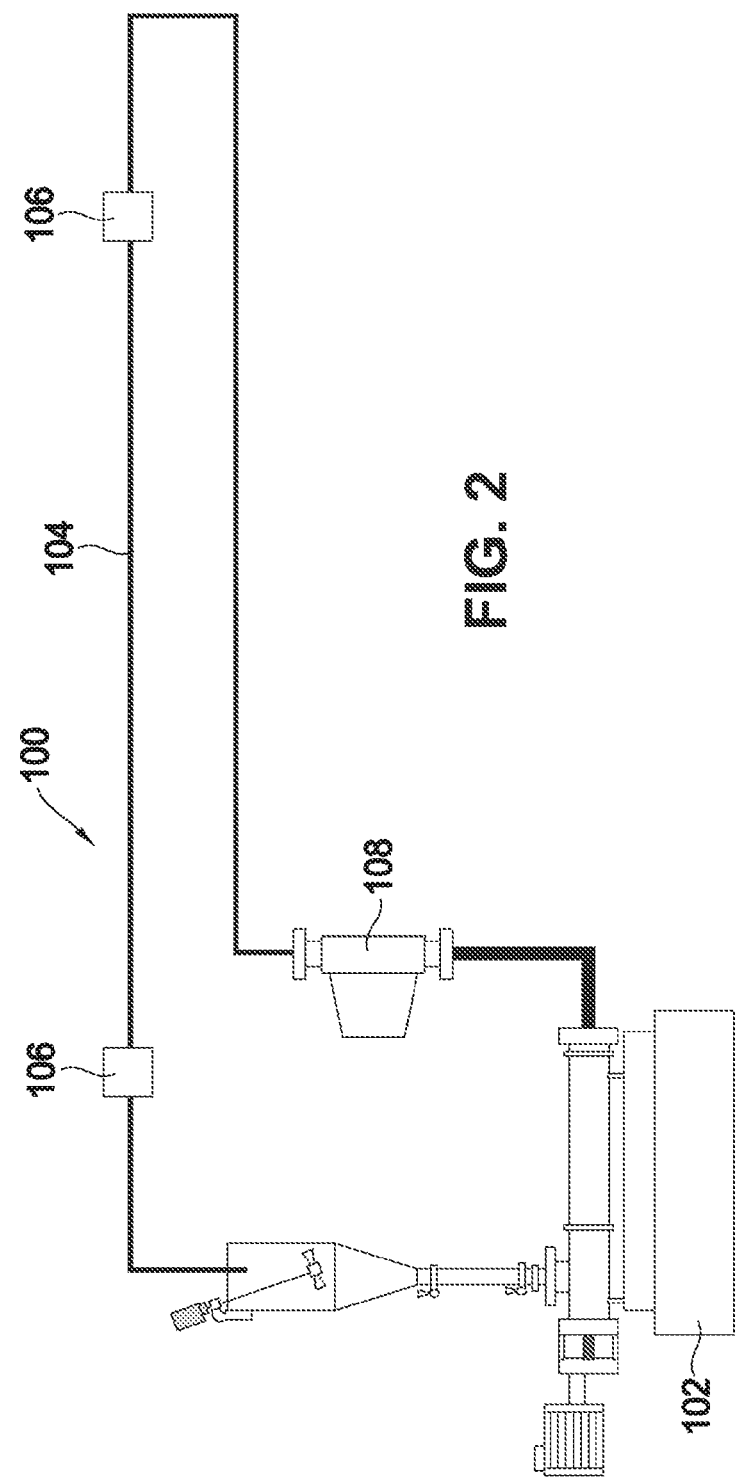
FIG. 2 illustrates a fluid friction flow loop apparatus of the present invention that may be used to test friction reducers used in well fracture applications.

FIG. 2 illustrates a fluid friction flow loop apparatus 100 of the present invention that can be used to test friction reducers used in well fracture applications. The fluid friction flow loop 100 can be constructed to circulate, using a pump 102, a given volume of water at a given flow rate and pressure through an inner diameter section of tubing 104. The difference in flow rate and pressure across the length of the tubing 104 can be measured by pressure sensors 106 and Coriolis mass flow meter(s) 108. These differences, along with the physical characteristics (e.g., diameter, length, etc.) of the tubing 104, can be used to quantify the performance of one friction reducer as compared to another in a given type of water. Waters high in electrolyte content and ionic strength tend to be harsher and cause a reduction in the effectiveness of the anionic polymers as friction reducers. Cationic polymer friction reducers are less affected by high electrolyte content but have been tied to reducing productivity of oil and gas wells in some regions.

Figure 3:
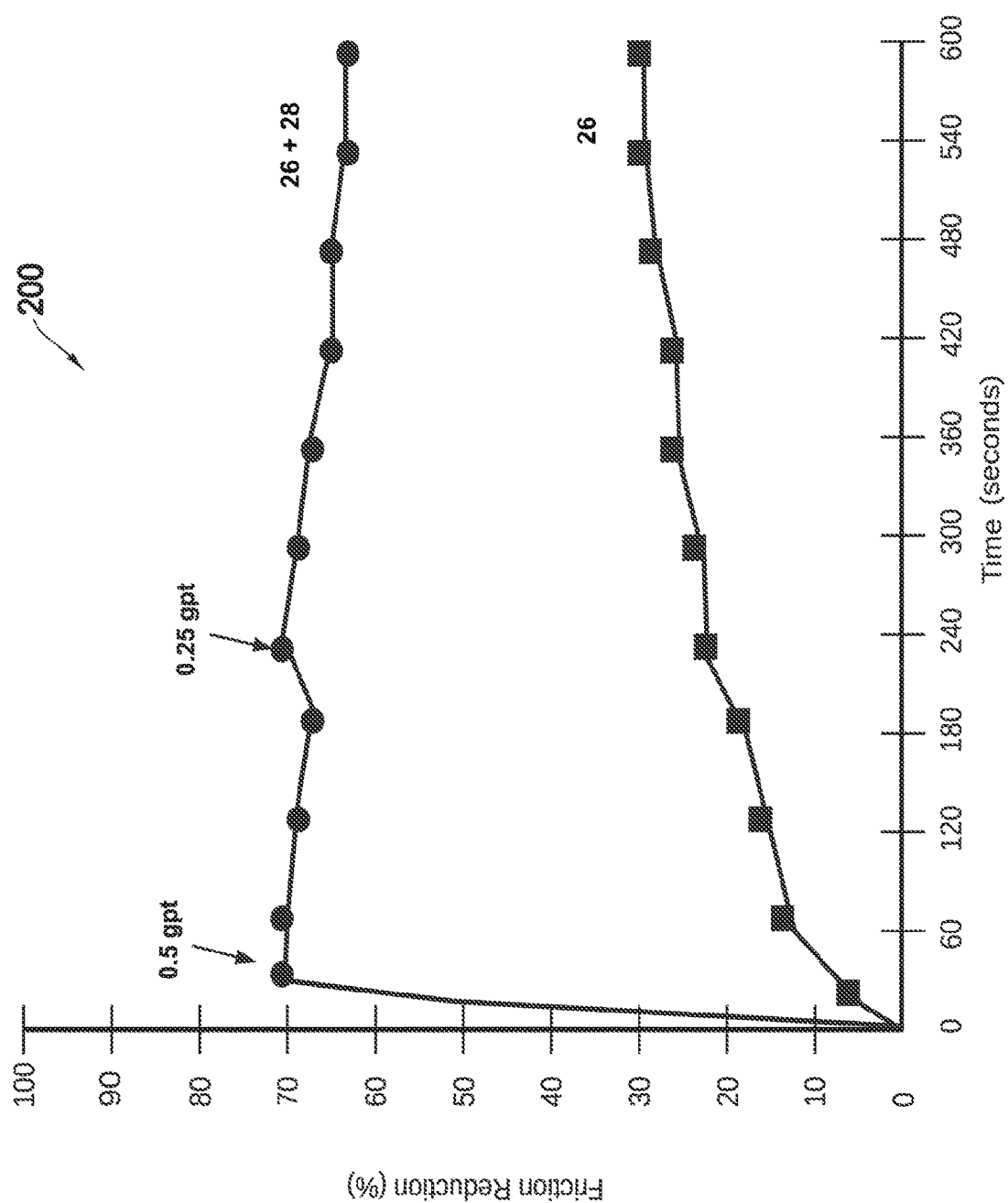
FIG. 3 illustrates a graph showing the friction reduction over time for fluids with and without a surfactant.

Certain embodiments of the present invention can use a sodium lauryl ether sulfate (SLES) surfactant 28 in combination with a sodium dodecyl sulfate (SDS or also referred to as SLS) to improve the performance of an anionic polyacrylamide polymer friction reducer 26 in a high electrolyte containing water. FIG. 3 illustrates a graph 200 showing the friction reduction over time for the friction reducer 26 in a flow loop 100 (not shown) with and without the use of surfactant 28. SLES is prepared by ethoxylation of dodecyl alcohol. The resulting ethoxylated surfactant 28 is converted to a half ester of sulfuric acid, which is neutralized by conversion to the sodium salt. The related surfactant 28 sodium lauryl sulfate (also known as sodium dodecyl sulfate or SDS) is produced similarly, but without the ethoxylation step. SLS and ammonium lauryl sulfate (ALS) can be used alternatives to SLES.

The SLES surfactants 28 can contain from one to three moles of ethylene oxide, or can contain two moles of ethylene.

In an embodiment, the SLES and SDS active ingredients can be blended in a ratio range of 1:2 (SLES:SDS), or 2:1 (SLES:SDS), with a preferred ratio of 1:1 (SLES:SDS). The minimum active surfactants 28 in this blend can range from 60 ppm to 500 ppm on an active basis, preferably from 75 to 300 ppm, and more preferably from 80 to 200 ppm.

The SDS surfactants 28 are commonly used in consumer products, and are not used for downhole fracture operations. The SLES and SDS, as used in certain embodiments, are commercially available from several manufacturing sources, including Stepan Company, Colonial Chemical, Pilot Chemical, AkzoNobel, Clariant, Croda, Solvay and Tiarco, and others.

In another embodiment, the surfactant 28 blend of SLES with SLS is supplemented and improved with the addition of sulfonate surfactant 28 when added at 30 to 100 ppm active for use in fracturing operation of the present invention.

Still in another embodiment, the surfactant 28 blend of SLES with SLS is supplemented and improved with the addition of a sophorolipid biosurfactant when added at 10 to 50 ppm active for use in fracturing operation of the present invention.

While various embodiments usable within the scope of the present disclosure have been described with emphasis, it should be understood that within the scope of the appended claims, the present invention can be practiced other than as specifically described herein.

The invention claimed is:

1. A method of using a fracture fluid downhole for fracturing a formation, comprising:
   storing water in a pump tank, wherein the water comprises dissolved solids at an ionic strength;
   adding a proppant to the stored water to create the fracture fluid;
   adding a water-soluble polymeric additive and a surfactant to create an enhanced fracture fluid, wherein the polymeric additive comprises friction reducing capabilities that are decreased by the ionic strength of the stored water, and wherein the surfactant comprises sodium lauryl ether sulfate and sodium dodecyl sulfate at a ratio between 2:1 and 1:2, and wherein the surfactant is concentrated in the enhanced fracture fluid between 60 ppm and 500 ppm; and
   pumping the enhanced fracture fluid with the water-soluble polymeric additive and the surfactant into the formation for fracturing the formation.

2. The method of claim 1, wherein the water-soluble polymeric additive comprises an anionic polyacrylamide.

3. The method of claim 1, wherein the surfactant further comprises a carboxylate surfactant, a sulfonate surfactant, a sophorolipid surfactant or combinations thereof.

4. The method of claim 3, wherein the sulfonate surfactant is concentrated in the enhanced fracture fluid between 30 ppm and 100 ppm.

5. The method of claim 3, wherein the sophorolipid surfactant is concentrated in the enhanced fracture fluid between 10 ppm and 50 ppm.

6. A method of fracturing a formation, comprising:
   pumping produced water from a wellbore, wherein the produced water comprises an ionic strength that is greater than fresh water;
   adding a proppant to the produced water to create a fracture fluid;
   adding a water-soluble polymeric additive and a surfactant comprising sodium lauryl ether sulfate and sodium dodecyl sulfate at a ratio between 2:1 and 1:2 to the fracture fluid to create an enhanced fracture fluid, wherein the water-soluble polymeric additive comprises friction reducing capabilities that are decreased by the ionic strength of the produced water, and wherein the surfactant is added at a concentration between 60 ppm and 500 ppm to increase friction reducing capabilities of the water-soluble polymeric additive in the enhanced fracture fluid; and
   pumping the enhanced fracture fluid into the formation for fracturing the formation.

7. The method of claim 6, wherein the wellbore providing the produced water is located adjacent to the formation being fractured.

8. The method of claim 6, wherein the wellbore providing the produced water is located within a 100 m distance of the formation being fractured.

9. The method of claim 6, wherein the water-soluble polymeric additive comprises an anionic polyacrylamide.

10. The method of claim 6, wherein the surfactant further comprises a carboxylate surfactant, a sulfonate surfactant, a sophorolipid surfactant or combinations thereof.

11. The method of claim 10, wherein the sulfonate surfactant is concentrated in the enhanced fracture fluid between 30 ppm and 100 ppm.

12. The method of claim 10, wherein the sophorolipid surfactant is concentrated in the enhanced fracture fluid between 10 ppm and 50 ppm.

\* \* \* \* \*